(12) United States Patent
Melia et al.

(10) Patent No.: US 7,929,556 B2
(45) Date of Patent: Apr. 19, 2011

(54) METHOD OF PRIVATE ADDRESSING IN PROXY MOBILE IP NETWORKS

(75) Inventors: Telemaco Melia, Saulx-les-Chartreux (FR); Bruno Mongazon-Cazavet, Saint Michel-sur-Orge (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/387,199

(22) Filed: Apr. 29, 2009

(65) Prior Publication Data

US 2010/0278070 A1   Nov. 4, 2010

(51) Int. Cl.
*H04L 12/56* (2006.01)
(52) U.S. Cl. ............. 370/401; 709/220; 455/435.1
(58) Field of Classification Search .......... None
See application file for complete search history.

(56) References Cited

U.S. PATENT DOCUMENTS

| | | | | |
|---|---|---|---|---|
| 2007/0268919 | A1* | 11/2007 | Sarikaya et al. | 370/401 |
| 2008/0295154 | A1* | 11/2008 | Suh et al. | 726/4 |
| 2009/0052396 | A1* | 2/2009 | Bucker et al. | 370/331 |
| 2009/0172785 | A1* | 7/2009 | Chowdhury et al. | 726/4 |
| 2009/0313118 | A1* | 12/2009 | Akiyoshi | 705/14.49 |

OTHER PUBLICATIONS

S. Gundavelli, Ed., *Proxy Mobile IPv6*, IETF Network Working Group, Aug. 2008, pp. 1-93.
R. Wakikawa, Ed., *IPv4 Support for Proxy Mobile IPv6*, draft-ietf-netlmm-pmip6-ipv4-support-11.txt., IETF Netlmm Working Group, Apr. 2009, pp. 1-51.
A. Muhanna, Ed., *GRE Key Option for Proxy Mobile IPv6*, draft-muhanna-netlmm-grekey-option-04.txt., IETF Netlmm Working Group, Jul. 2008, pp. 1-15.
D. Johnson, Ed., *Mobility Support in Ipv6*, IETF Network Working Group, Jun. 2004, pp. 1-155.
ALCA.210.22EP, Jul. 21, 2010, Berlin—Extended Search Report—5 pages.

* cited by examiner

*Primary Examiner* — Daniel J Ryman
*Assistant Examiner* — Brian Roberts
(74) *Attorney, Agent, or Firm* — Martin I. Finston

(57) ABSTRACT

A method is disclosed, by which a local mobility anchor (LMA) In a proxy mobile IP network can perform address assignment for a mobile node in cooperation with network address translation, so that the mobile node can be configured with a private HoA. In one embodiment, the LMA obtains the NAI of a mobile node (MN) that is: (i) operating as an IPv4 host and (ii) seeking entry to the network as its home network. The LMA identifies a DHCP server located in the network and serving at least one NAT, and sends it a request message in which the ClientId is set equal to the NAI of the mobile node. The LMA receives a private HoA from the DHCP server, which it forwards in a PBA message to a mobile access gateway (MAG) connected to the MN.

6 Claims, 3 Drawing Sheets

DHCP SERVER CO-LOCATED WITH MAG

DHCP RELAY CO-LOCATED WITH MAG

METHOD OF PRIVATE ADDRESSING IN PROXY MOBILE IP NETWORKS

FIELD OF THE INVENTION

The invention relates to Internet Protocol (IP) networks, and more particularly to networks that support Mobile IP (MIP). Still more particularly, the invention relates to methods for configuring Mobile Nodes (MNs) in Proxy MIP networks.

ART BACKGROUND

Packet-switched networks use the Internet Protocol (IP) to deliver packets from a source host to a destination host using addressing structures that are based solely on the respective host addresses. The most widespread addressing structures in current use are IP Version 4 (IPv4), and its successor, IP Version 6 (IPv6). Whereas IPv4 uses 32-bit addresses, IPv6 uses 128-bit addresses, divided into a prefix of 64 bits and a suffix of 64 bits. Because IP is designed to be flexible enough for use across networks having different technologies for link-layer implementation, a protocol is provided for resolving IP addresses to data link addresses. In IPv4 networks, this protocol is Address Resolution Protocol (ARP), and in IPv6 networks, it is Neighbor Discovery Protocol (NDP).

Although the earliest IP networks involved fixed nodes, there has been an increasing need to support users who wish to maintain their internet connections while moving, and, indeed, while roaming between different subnets or different wireless systems. Mobile IP is a protocol that permits a Mobile Node (MN) to maintain an unchanging home IP address (HoA) despite changing its point of attachment to the internet. In Mobile IP, a router on the MN's home network, assumes the representation of the MN while the MN is attached to a foreign network.

The MN, when it connects to the foreign network, is assigned a Care-of Address (CoA). The MN informs its Home Agent of the CoA in a binding update message. This causes a bidirectional tunnel to be set up between the Home Agent and the MN (at its CoA). Now, if a correspondent node (i.e., any node other than the MN under discussion) wishes to send packets to the MN, it will address the packets to the HoA. These packets will be delivered to the Home Agent, which will encapsulate them and forward them via the bidirectional tunnel to the MN at its CoA. Conversely, the MN may use the bidirectional tunnel for sending packets to the correspondent node. Alternatively, the MN may send packets directly to the correspondent node, although the precise procedures for doing so differ between Mobile IPv4 and Mobile IPv6.

Proxy Mobile IP (PMIPv6) is a more recent standard that provides functionality similar to Mobile IP, but that obviates any need for the host implemented in the MN to include any protocol modifications adapted to support mobility. Instead, all mobility support is implemented on the fixed side of the network, including keeping track of the location of the MN. In particular, the MN is able to keep its HoA, and does not need to be configured with an additional CoA. (However, the CoA is used elsewhere in the network, as explained below.)

PMIPv6 introduces two special functionalities for mobility support: These are the Mobility Access Gateway (MAG) and the Local Mobility Anchor (LMA). The Mobility Access Gateway (MAG), which is supported on an access router, manages the mobility-related signaling for an MN that is attached to its access link. The MAG tracks the MN's coming to and going from the access link, and supports the MN's mobility by exchanging signaling messages with the MN's Local Mobility Anchor (LMA). The LMA is the Home Agent for the MN in a Proxy Mobile IPv6 domain, i.e., in a network that implements the PMIPv6 protocol.

The PMIPv6 protocol is initiated when a mobile host, executing in an MN, enters a PMIP domain and attaches to an access link. A brief summary of the ensuing transactions is presented below. More details can be found in S. Gundavalli, Ed., *RFC* 5213, "Proxy Mobile IPv6," IETF Network Working Group (August 2008), http://tools.ietf.org/html/rfc5213, particularly at Section 3, "Proxy Mobile IPv6 Protocol Overview", pp. 9-15.

After the MN attaches to an access link, the MAG on that access link acquires the identity of the MN and determines whether the MN is authorized for entry, i.e., whether it is authorized for the pertinent network-based mobility-management service. If the authorization is confirmed, the MN will be able to obtain an address configuration on the connected interface. Subsequently, support by the network will assure that the entire PMIP domain appears to the MN as a single link.

The address configuration obtained by the MN includes at least one home address (HoA) and the default-router address on the connected link. The home network prefix is a prefix assigned to the link between the MN and the MAG. The HoA is an address from the MN's home network prefix. The MN will be able to use this address as long as it is attached to the access network that is within the scope of the PMIP domain.

One difference between Mobile IPv6 and PMIPv6 is that in Mobile IPv6, the home agent is apprised of the home address of the MN. In PMIP, by contrast, the mobility entities are required to know the MN's home network prefixes, but do not necessarily know the exact address that the MN configured on its interface from its home network prefix. However, there is a stable identifier of the MN, referred to as the Mobile Node Identifier (MN-Identifier), that the PMIP mobility entities can acquire and can use for identifying the MN. The MN-Identifier is typically the Network Access Identifier (NAI), or some other identifier such as the Media Access Control (MAC) address.

As in ordinary IP and in Mobile IP, the protocol used to obtain address configuration information is Dynamic Host Configuration Protocol (DHCP). Network devices, acting as DHCP clients, obtain network parameters, including addresses, from DHCP servers. Thus, for example, a DHCP client at the MN may obtain address information from a DHCP server implemented at the MAG, or alternatively, it may obtain the address information from a DHCP server implemented at the LMA, which forwards the information through a DHCP relay implemented at the MAG.

The mobile node connecting to the PMIP domain may be an IPv4 node or an IPv6 node, or it may have dual capability. According to which IP version is applicable, the MN will be configured with an IPv4 or IPv6 address (or even dual addresses). In an IPv6 transport network, IPv4 in IPv6 tunneling may be provided to deliver IPv4 traffic. If an IPv4 transport network is used between the MAG and the LMA, IPv6 in IPv4 tunneling is implemented.

As in Mobile IP, the PMIP network also establishes a bidirectional tunnel between the LMA and the MAG. A global address, referred to as the LMA Address (LMAA) is configured on the interface of the LMA as one transport endpoint of the tunnel. This is the address to which the MAG sends Proxy Binding Update (PBU) messages, which are discussed below.

Another global address, referred to as the Proxy Care-of Address (Proxy-CoA), is configured on the egress interface of the MAG. This address is the other transport endpoint of the tunnel between the LMA and the MAG. To the LMA, this is the care-of address of the MN. The LMA registers this address in the Binding Cache entry for the MN.

In this regard, a "binding" associates the MN's home network prefix (as assigned to a given interface of the MN) with the MN's current Proxy-CoA. Such associations typically have limited lifetimes. The remaining lifetime of a given such association may be included in the information referred to as the "binding." Bindings are established through Proxy Binding messages exchanged between the MAG and the LMA. More specifically, the MAG requests the establishment of a binding by sending a PBU to the LMA. The LMA responds by sending a Proxy Binding Acknowledgement (PBA) to the MAG.

As noted above, IPv6 uses 128-bit addresses, whereas IPv4 uses 32-bit addresses. Because of the high demand for IP addresses, the total space of possible public IPv4 addresses is prone to exhaustion. One way to mitigate that problem is to locally share public IPv4 addresses. That is, a plurality of nodes within, e.g., a private network may share a single public IP address which is visible to the outside world, but within the private network use private IP addresses that are not globally routable on the Internet. With such an arrangement, public IP addresses may be shared without confusion. At the interface between the private and public networks, a network entity such as a Network Address Translation (NAT) box or gateway translates between the private and public address space.

For the above reasons, among others, it will at least sometimes be desirable to allocate one or more private home addresses to an IPv4 mobile node attaching to a Proxy Mobile IPv6 network. The PMIPv6 specification RFC 5213 does not specify a procedure for making such an address allocation. This procedure may, however, be requested by some deployment scenarios.

SUMMARY OF THE INVENTION

We have developed a method by which the LMA can perform address assignment for the mobile node in cooperation with network address translation, so that the mobile node can be configured with a private HoA.

In an embodiment, the invention provides a method in which an LMA belonging to a proxy MobileIP network obtains the NAI of a mobile node (MN) that is: (i) operating as an IPv4 host and (ii) seeking entry to the network as its home network. The LMA sends a DHCP request to a DHCP server that is: (i) located in the network and (ii) serving at least one NAT, wherein the DHCP request contains a ClientId field, and the ClientId field is set equal to the NAI. The LMA receives a private HoA in a DHCP Ack message from the DHCP server, and then it sends the private HoA in a Proxy Binding Acknowledgement (PBA) message to a MAG connected to the MN.

DETAILED DESCRIPTION

The PMIPv6 protocol as defined in RFC 5213 allows mobile terminals without host modifications to seamlessly change their point of attachment to the access network while preserving their IP addresses and maintaining uninterrupted ongoing IP sessions. As explained above, PMIPv6 introduces two functional blocks, the Mobile Access Gateway (MAG) and the Local Mobility Anchor (LMA). The MAG is the first routing hop at which the MN is connected. The MAG assists in address configuration and data delivery from/to the MN. The MAG tunnels packets between the MN and the LMA, which plays a role similar to that of the Home Agent as specified in MIPv4/6 (RFC 3775). The LMA is the mobility anchor. It assigns a home IP address to the MN and is the entry point for the inbound traffic sent from the correspondent nodes that are in communication with the MN.

PMIPv6 uses a particular prefix delegation model, referred to as "per mobile node prefix." That is, each MN connecting to the PMIPv6 domain is assigned a unique prefix that will be the same for the lifetime of a mobility session. The MN is virtually connected on the home link (at the LMA). Proper delivery of datagrams to the MN's current location is achieved through tunneling (e.g. IPv6 in IPv6) between the LMA and the MAG. The LMA can also deliver an IPv4 HoA to the MN. Tunneling of IPv4 datagrams over IPv6 is also possible.

An unmodified IPv4 host can therefore connect to the PMIPv6 domain and get mobility support. However, no provision is made in the existing standard as to how the HoA (Home Address) is assigned to the IPv4 mobile host, particularly in the event that the operator deploys the LMA behind a Carrier Grade NAT (CGN). A CGN is a NAT device typically placed by network operators between Customer Premises Equipment (CPE) and the public internet to convert CPE private IP addresses, ports, and identifiers into external IP addresses, ports, and identifiers. When LMA is behind a CGN, the CGN enables an operator to assign a private HoA to a MN and to share public IP addresses among several mobile subscribers. Accordingly, there remains a need for a method of assigning the right private HoA to an IPv4 MN connecting to a PMIPv6 domain where CGN is deployed.

Figure 1:
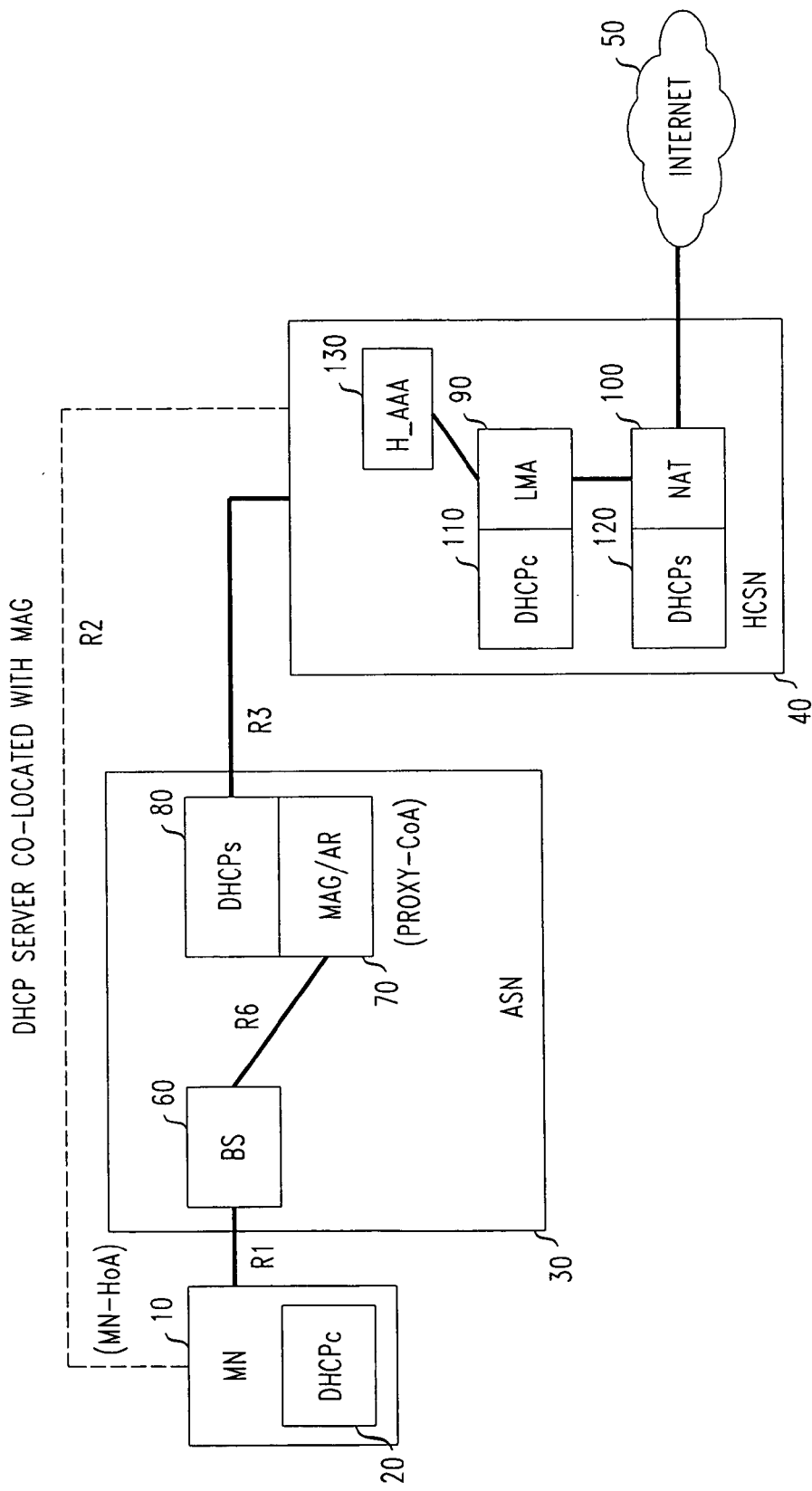
FIG. 1 is a schematic block diagram of an illustrative network in which PMIPv6 is supported. In the network of FIG. 1, the MAG implements a DHCP server.

We turn now to FIG. 1, where an illustrative network includes mobile node 10 connected by link R1 to Access Service Network (ASN) 30, which is connected by link R3 to Home Connectivity Service Network (HCSN) 40. Link R2, shown as a broken line, is a logical link used to configure authentication relationships between MN and H_AAA (the Home Authentication Authority). It is used during network entry. Outside NAT box 100, HCSN 40 is connected to the external internet.

At the mobile node, there is an implementation of DHCP client 20 oriented toward the MAG, which among other things allows the configuration of the MN with its HoA.

ASN 30 includes base station 60, connected by link R6 to MAG 70. As shown, the MAG is co-located with an Access Router (AR) and with DHCP server 80, which is oriented toward the DHCP client at the mobile node.

HCSN 40 includes LMA 90, NAT box 100, and AAA server 130. The LMA is co-located with DHCP client 110, which is oriented toward the NAT box, and the NAT box is co-located with DHCP server 120, which is oriented toward DHCP client 110.

Figure 2:
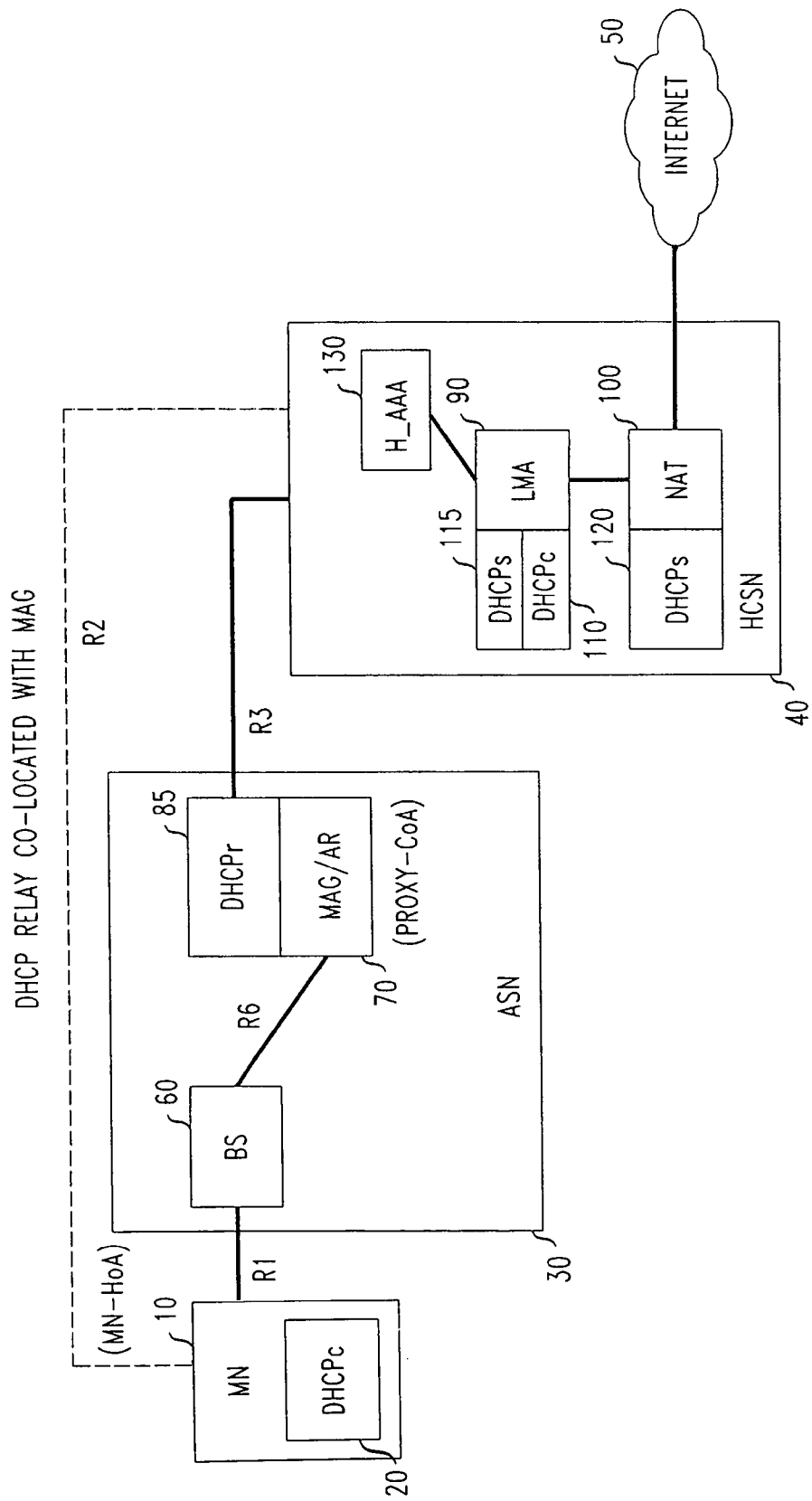
FIG. 2 is a schematic block diagram of an alternative network in which PMIPv6 is supported. In the network of FIG. 2, the MAG implements a DHCP relay. Common elements with FIG. 1 are labeled with similar reference numerals.

Turning now to FIG. 2, the network shown there is similar to the network of FIG. 1, except that a DHCP relay (instead of a DHCP server) is co-located with the MAG, and the LMA is co-located with both a DHCP client oriented toward the NAT box and a DHCP server oriented toward the DHCP relay in the ASN.

Our new method makes it possible for LMA 90 to perform address assignment for MN 10 according to the NAT topology. When LMA 90 receives a PBU from MAG 70, the LMA will select a HoA (the LMA may in fact select only a home network prefix) to be assigned to the MN. As used in this regard, the term HoA shall herein mean either the full HoA or the home network prefix. This HoA is retrieved via DHCP client 110 in the LMA, which as noted above faces toward DHCP server 120. DHCP server 120 may be implemented in NAT box 100.

LMA 90 will use the NAI of MN 10 as the value of ClientID to be included in the DHCP request. In the event that LMA 90 is connected to several NATs, it can use the NAI received in the PBU to select the most appropriate NAT for servicing the address request. Different NAT boxes might be selected based on any of the following factors, among others: the MN profile, the service requirements, and the current loads of the respective available NAT boxes. Subject to the applicable selection factors, the LMA may, for example, request an address from a NAT box that allows a specified class of applications.

In the network of FIG. 1, DHCP server 80 (which as noted is co-located with MAG 70 and faces the DHCP client at the MN) obtains the private home address (HoA-priv) associated with a mobile node's NAI by engaging in a PBU/PBA exchange with LMA 90. DHCP server 80 returns the HoA-priv during subsequent DHCP exchanges with the mobile node identified by the NAI.

In the network of FIG. 2, by contrast, DHCP relay 85 (which as noted is co-located with MAG 70 and faces both DHCP client 20 at the MN and DHCP server 115 at the LMA) relays the DHCP exchanges with the mobile toward LMA 90. The LMA, in turn, performs the HoA-priv allocation in accordance with PBU/PBA exchange based on the mobile node's NAI.

Figure 3:
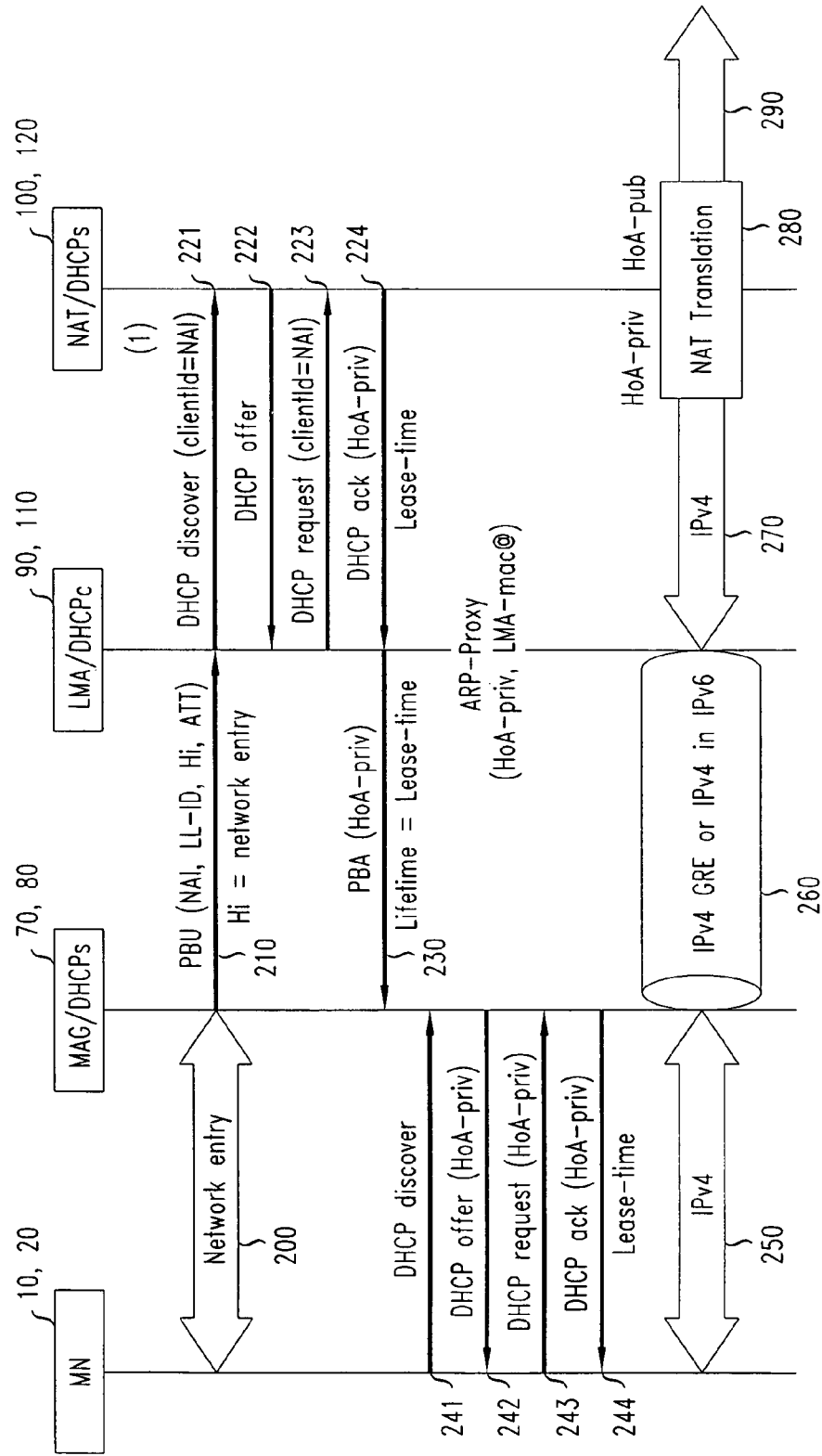
FIG. 3 is a message flow diagram that illustrates the invention in one embodiment. The method illustrated in FIG. 3 is implemented in a network in which the DHCP server is located in the MAG as illustrated, for example, in FIG. 1. Common elements with FIGS. 1 and 2, although having a different graphical representation, are labeled with similar reference numerals.

With reference to FIG. 3, we will now describe a message flow according to an embodiment of our invention, as practiced in a network such as the network of FIG. 1. As those skilled in the art will appreciate, WiMax and WiFi networks, among others, are examples of types of networks that may be useful in this regard.

At element 200, MN 10 has powered on the network interface and is performing network entry. At element 210, layer two attachment and MN detection have taken place, and MAG 70 is sending to LMA 90 the PBU message containing the NAI as the mobile node identifier. The same PBU message contains the MN link layer identifier, the Handover Indication and the Access Technology Type.

The LMA upon reception of the PBU verifies that MN 10 is allowed to obtain PMIPv6 service and allocates the HoA.

More specifically, LMA 90 acquires a private HoA (HoA-priv) by interrogating a DHCP server, such as server 120, that is located in the home network and serves one or more NATs. The ClientID used for the DHCP handshake (elements 221-224 of the figure) is the NAI. (The NAI may be used solely, or, e.g., in combination with parameters such as the link layer identifier and the access technology type.)

The standard syntax for an NAI is "user@realm". Thus, the particular realm contained in the NAI can be used to send a DHCP request to specific DHCP servers. As a consequence, NAT selection may be performed in a manner that is responsive to the particular value of the NAI.

The DHCP discovery phase, shown in the figure as element 221 (DHCP discover) and element 222 (DHCP offer) is invoked if the DHCP server address is unknown. Otherwise, the DHCP handshake consists of element 223 (DHCP request, including ClientID set equal to the mobile node's NAI), and element 224 (DHCP ack, including the HoA-priv).

At element 230, LMA 90 has received the HoA-priv in the DHCP ack from DHCP server 120, and the LMA, in turn, sends a PBA message to MAG 70. This PBA message contains the HoA-priv, which is anchored at the LMA and routed through the correct CGN using regular ARP proxy mechanisms. In other words, LMA 90 is performing the role of ARP-proxy for the address pair (HoA-priv, LMAmac@). From the CGN point of view, the mobile IP address (HoA-priv) is bound to the LMA MAC address (LMAmac@). The result of this proxy behavior by the LMA is that to the CGN, the mobile appears to be on its home network, and the mobile-destined packets meanwhile get forwarded by the CGN to the mac address of the LMA. The LMA then tunnels the packets toward the MAG. To the IP external network, the MN is viewed using a public IP address allocated by the CGN at a given time.

Turning back to FIG. 3, it will be seen at elements 241-244 that after the PBA containing HoA-priv is received by MAG 70, the mobile node performs standard DHCP message exchange to configure the IPv4 address on the wireless interface. This message exchange might include DHCP discover (element 241) and offer (element 242) messages and always includes request (element 243), and ack (element 244) messages. As shown in the figure, the offer, request, and ack messages include HoA-priv as an argument.

It should be noted that in accordance with established protocols, the HoA-priv delivered to the LMA at element 224 of FIG. 3 is assigned for a defined length of time, referred to as the lease-time. The length of time might be finite or infinite (i.e., unlimited). The binding sent by LMA 90 to MAG 70 in the PBA at element 230 of the figure has a lifetime set equal to the lease-time of the home address. Then, when the home address is configured at the mobile node, it is configured with the same lease-time.

As shown at the bottom of FIG. 3, the operations described above result in the establishment of a tunnel 260 between MAG 70 and LMA 90. Depending on the addressing structure of the underlying network, transport in this tunnel may be, for example, IPv4 GRE or IPv4 in IPv6. However, packets on the last link between the mobile node and the MAG are not tunneled. (In the case described here, these are native IPv4 packets.) Instead, they are delivered using ordinary Layer 2 mechanisms implemented by the access network between MAG and MN, as indicated at element 250. As indicated at element 280 of the figure, the NAT box (which may, for example, be a CGN) performs address translation between the public side 290 and the private side 270 of the network.

It should be noted that the MN is not aware of any PMIPv6/NAT operation occurring in the network. If necessary, the MN may perform standard operations (such as STUN) for NAT discovery. That is, the MN might in some instances need to deal with its IP address at the application level, because there are some applications that use IP addresses in their data exchanges. In the event that the IP address is of the private kind, such applications will not be self-sufficient, and will instead rely on other public servers on the Internet to discover the public IP address that is currently mapped by a CGN to the private address. STUN servers and protocols, for example, are often useful for that purpose. The approach that we describe here is transparent to the usage of such protocols, and thus is compatible with such applications.

What is claimed is:

1. A method for performance by a Local Mobility Anchor (LMA) belonging to a Proxy Mobile Internet Protocol (PMIP) network, comprising:

obtaining a Network Access Identifier (NAI) of a mobile node (MN) that is: (i) operating as an Internet Protocol Version 4 (IPv4) host and (ii) seeking entry to the PMIP network as its home network;

sending a Dynamic Host Configuration Protocol (DHCP) request to a DHCP server that is: (i) located in the PMIP network and (ii) serving at least one Network Address Translation (NAT) device, wherein the DHCP request contains a ClientId field, and the ClientId field is set equal to the NAI;

receiving a private home address (HoA) in a DHCP Ack message from the DHCP server; and sending the private HoA in a Proxy Binding Acknowledgement (PBA) message to a Mobile Access Gateway (MAG) connected to the MN.

2. The method of claim 1, wherein the LMA obtains the NAI of the MN in a proxy binding update (PBU) message from the MAG.

3. The method of claim 1, further comprising establishing an IPv4 Generic Routing Encapsulation (GRE) tunnel with the MAG for forwarding packets to and from the MN.

4. The method of claim 1, further comprising establishing an IPv4 in Internet Protocol Version 6 (IPv6) tunnel with the MAG for forwarding packets to and from the MN.

5. The method of claim 1, wherein the DHCP server serves a particular NAT device determined by the NAI.

6. The method of claim 1, wherein the private HoA is a private home network prefix.

* * * * *